United States Patent [19]

Hanyu et al.

[11] Patent Number: 5,007,716

[45] Date of Patent: Apr. 16, 1991

[54] LIQUID CRYSTAL DEVICE

[75] Inventors: Yukio Hanyu; Toshiharu Uchimi, both of Atsugi, Japan

[73] Assignee: Canon Kabushiki Kaisha, Tokyo, Japan

[21] Appl. No.: 295,509

[22] Filed: Jan. 11, 1989

[30] Foreign Application Priority Data

Jan. 11, 1988 [JP] Japan .................................. 63-004312

[51] Int. Cl.[5] ............................................. G02F 1/133
[52] U.S. Cl. .................................... 350/336; 350/341; 350/350 S
[58] Field of Search ..................... 350/350 S, 340, 341, 350/336, 344, 334

[56] References Cited

U.S. PATENT DOCUMENTS

| | | | |
|---|---|---|---|
| 4,561,726 | 12/1985 | Goodby et al. | 350/341 |
| 4,589,996 | 5/1986 | Inoue et al. | 252/299.65 |
| 4,596,667 | 6/1986 | Inukai et al. | 252/299.65 |
| 4,613,209 | 9/1986 | Goodby et al. | 350/350 S |
| 4,614,609 | 9/1986 | Inoue et al. | 252/299.66 |
| 4,615,586 | 10/1986 | Geary et al. | 350/350 S |
| 4,674,839 | 6/1987 | Tsuboyama et al. | 350/334 |
| 4,728,176 | 3/1988 | Tsuboyama et al. | 350/341 X |
| 4,744,639 | 5/1988 | Tsuboyama | 350/341 X |
| 4,747,671 | 5/1988 | Takahashi et al. | 350/336 |
| 4,824,218 | 4/1989 | Kuno et al. | 350/350 S |

FOREIGN PATENT DOCUMENTS

| | | |
|---|---|---|
| 0228557 | 7/1987 | European Pat. Off. . |
| 0307959 | 3/1989 | European Pat. Off. ......... 350/350 S |
| 107217 | 8/1981 | Japan . |

OTHER PUBLICATIONS

Kondo et al., "Preparation of Monodomain Cells of Ferroelectric Liquid Crystals and their Evaluation with an Optical Microscope", Japanese Journal of Applied Physics, vol. 20, No. 10 Oct., 1981, pp. 1773-1777.

"Study on Structure of SSFLC State by Microscopic Spectral Analysis", Liquid Crystal Forum (Oct. 1987) pp. 114-115.

*Primary Examiner*—Stanley D. Miller
*Assistant Examiner*—Anita P. Gross
*Attorney, Agent, or Firm*—Fitzpatrick, Cella, Harper & Scinto

[57] ABSTRACT

A liquid crystal device, includes: (a) a first substrate and a second substrate, (b) an elongated first electrode disposed on the first substrate and an elongated second electrode disposed on the second substrate so as to intersect the first electrode and form a pixel at the intersection of the first and second electrodes, (c) a linear projection disposed along the length of at least one of the first and second electrodes, and (d) a chiral smectic liquid crystal disposed between the first and second substrates in a thickness small enough to suppress the formation of a helical structure inherent to the chiral smectic liquid crystal in its bulk state. The chiral smectic liquid crystal forms a domain in such an alignment state that the liquid crystal has an inclination of forming or actually forms a pair of a hairpin defect and a lightning defect, the hairpin defect being disposed closer to the linear projection than the lightning defect.

14 Claims, 10 Drawing Sheets

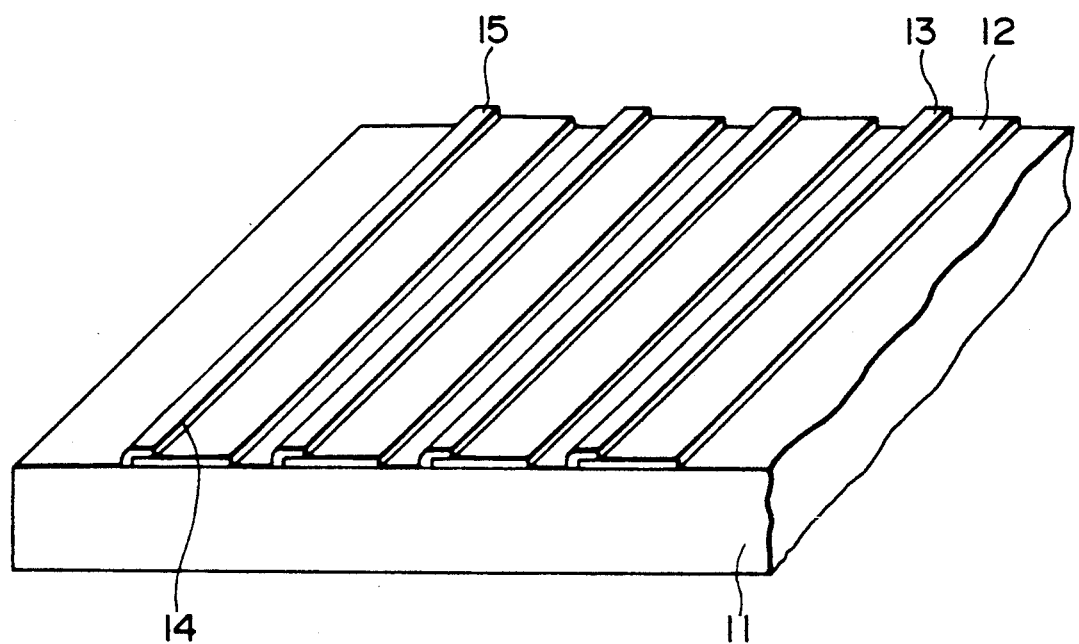
F I G. 1

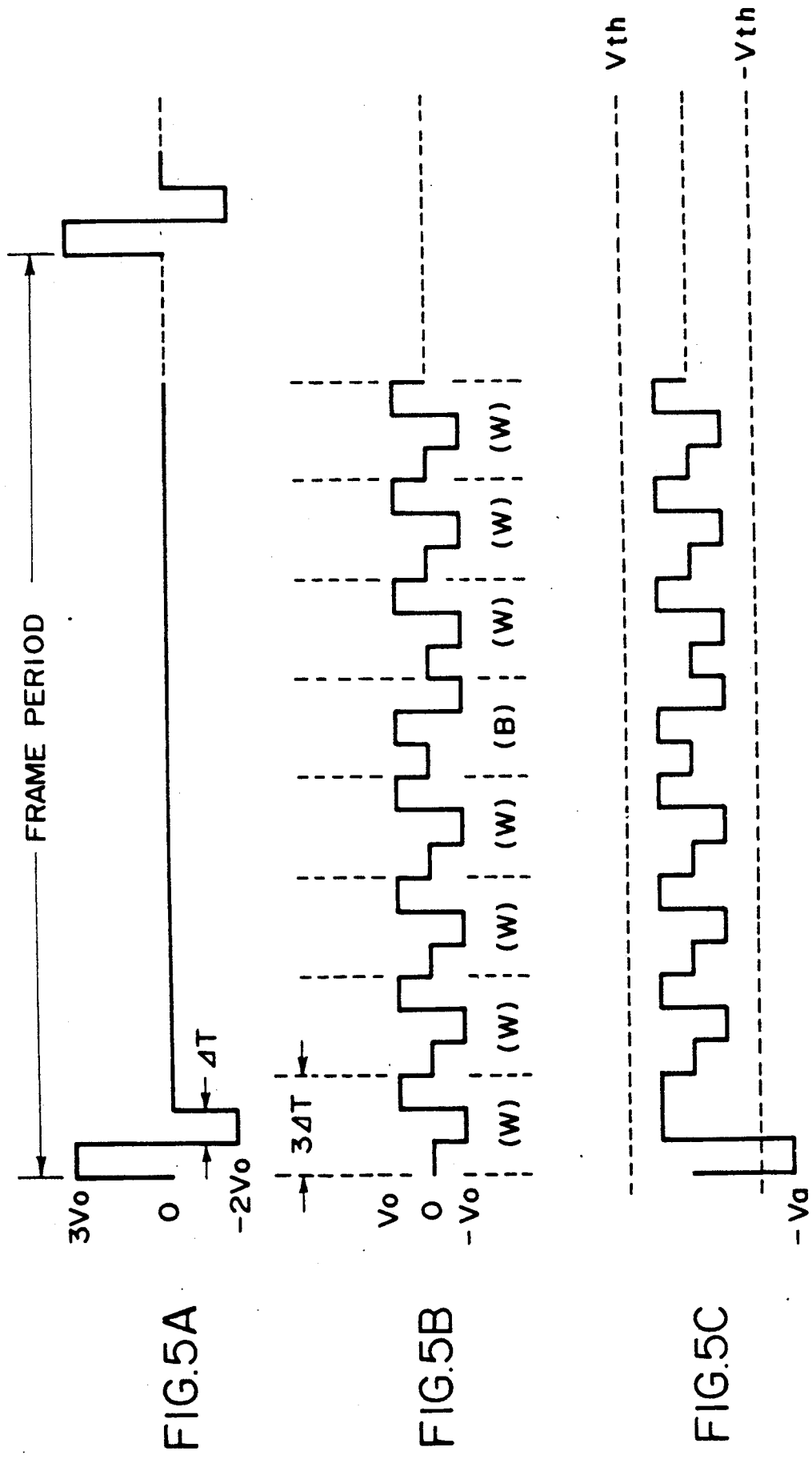

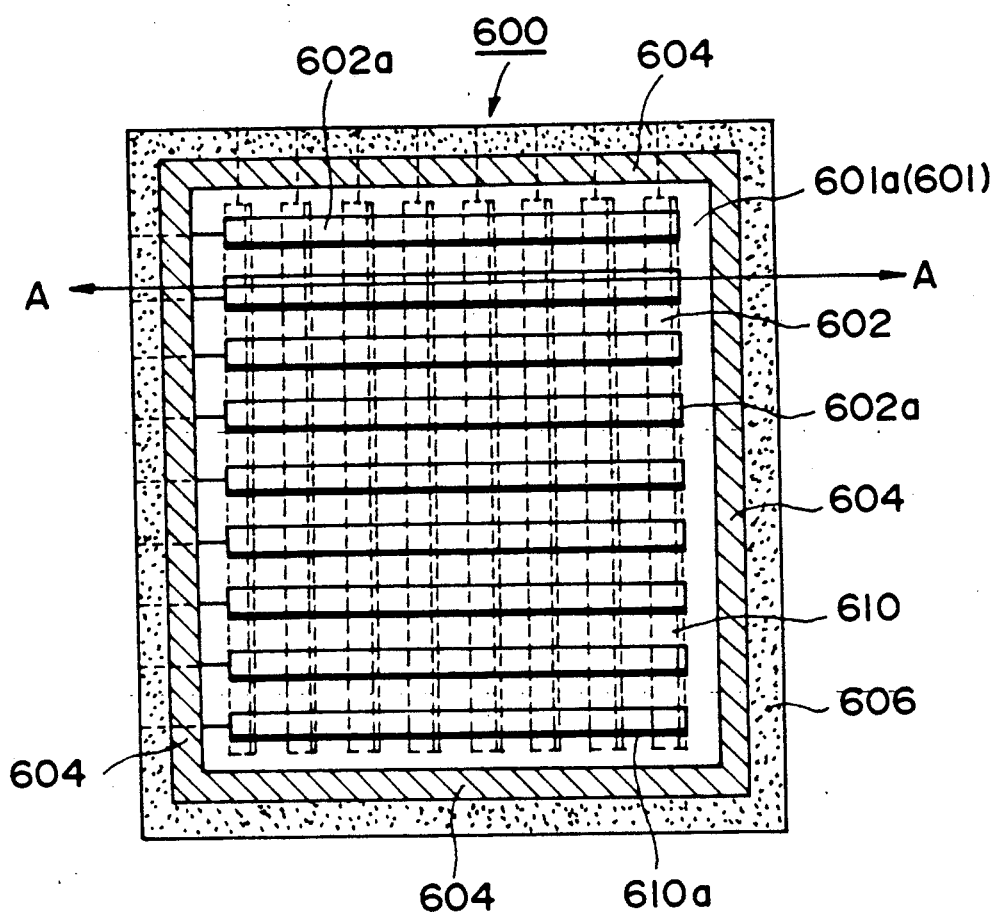
F I G. 6A
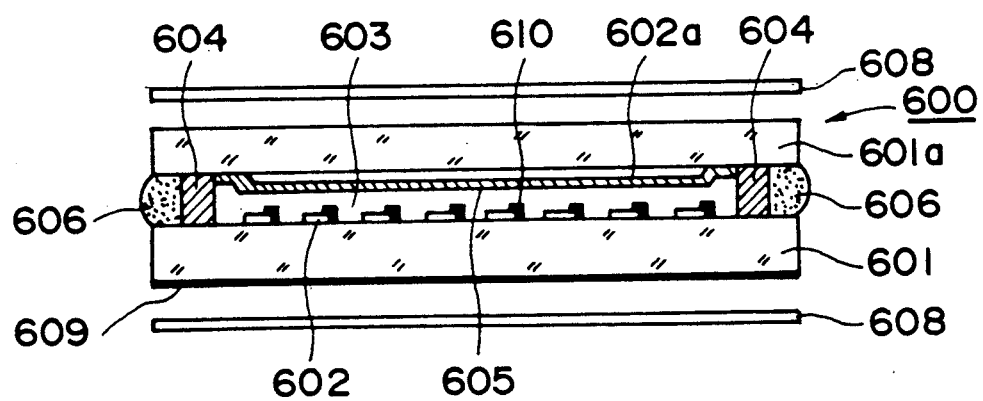
F I G. 6B

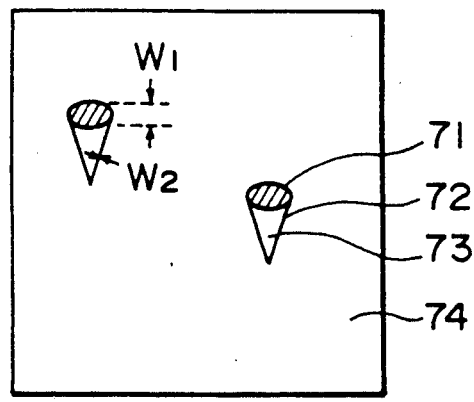
F I G. 7A
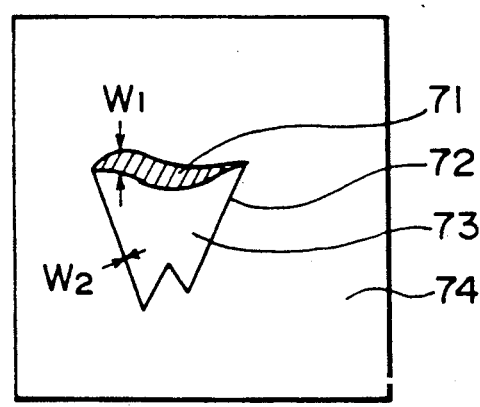
F I G. 7B
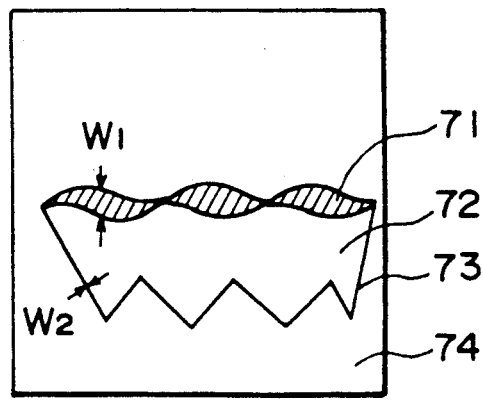
F I G. 7C

LIQUID CRYSTAL DEVICE

FIELD OF THE INVENTION AND RELATED ART

The present invention relates to a liquid crystal device using a chiral smectic liquid crystal, and particularly a chiral smectic liquid crystal device which suppresses the occurrence of flickering during multiplexing drive.

A display device of the type which controls transmission of light in combination with a polarizing device by utilizing the refractive index anisotropy of ferroelectric liquid crystal molecules has been proposed by Clark and Lagerwall (Japanese Laid-Open Patent Application No. 107217/1981, U.S. Pat. No. 4,367,924). The ferroelectric liquid crystal has generally chiral smectic C phase (SmC*) or H phase (SmH*), and is provided with a bistable orientation or alignment state where the liquid crystal molecules assume either one of a first optically stable state and a second optically stable state in response to an applied electric field; such a liquid crystal also has a memory characteristic of retaining the resultant state in the absence of an electric field, and also shows a high-speed response to a change in the applied electric field. As a result, the ferroelectric liquid crystal is expected to be widely utilized in a high speed and memory type optical modulation device.

In the above-mentioned chiral smectic liquid crystal device, an electrode matrix is provided comprising scanning electrodes and data electrodes wherein a scanning signal is sequentially applied to the scanning electrodes and data signals are applied to the data electrodes in synchronism with the scanning signal for multiplex driving drive. During the multiplex driving of such a chiral smectic liquid crystal device, there is observed flickering on a display picture (flickering caused due to a periodical change in luminance on the whole picture) when the device is driven in a refresh mode by periodically and repetitively applying a scanning signal to the scanning electrodes.

SUMMARY OF THE INVENTION

An object of the present invention is to provide a liquid crystal device having solved the above-mentioned problem of flickering.

According to a first aspect of the present invention, there is provided a liquid crystal device, comprising:

(a) a first substrate and a second substrate, (b) an elongated first electrode disposed on the first substrate and an elongated second electrode disposed on the second substrate so as to intersect the first electrode and form a pixel at the intersection of the first and second electrodes, (c) a linear projection disposed along the length of at least one of the first and second electrodes, and (d) a chiral smectic liquid crystal disposed between the first and second substrates in a thickness small enough to suppress the formation of a helical structure inherent to the chiral smectic liquid crystal in its bulk state, the chiral smectic liquid crystal forming a domain in an alignment state such that the liquid crystal has an inclination of forming or actually forms a pair of a hairpin defect and a lightning defect, the hairpin defect being disposed closer to the linear projection than the lightning defect.

According to a second aspect of the present invention, there is provided a liquid crystal device, comprising:

(a) a first substrate and a second substrate, (b) an elongated projection forming a stepwise elevation extended in one direction, on a face of at least one of the first and second substrates, and (c) a chiral smectic liquid crystal disposed between the first and second substrates in a thickness small enough to suppress the formation of a helical structure inherent to the chiral smectic liquid crystal in its bulk state, said chiral smectic liquid crystal forming a domain in an alignment state such that the liquid crystal forms a plurality of adjacent molecular layers each comprising a plurality of molecules, and the molecular layers have a normal thereto intersecting the edge of the stepwise elevation extended in one direction with an intersection angle.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1 is a partial perspective view of a substrate used in the present invention;

FIGS. 5A, 5B and 5C are waveform diagrams showing driving voltage waveforms used in an embodiment of the present invention;

FIG. 6A is a plan view of a cell used in the present invention, FIG. 6B is a sectional view taken along the line A—A in FIG. 6A; and FIG. 7A–7C are explanatory views including a sketch of a hairpin defect and a lightning defect.

DETAILED DESCRIPTION OF PREFERRED EMBODIMENTS

According to our research based on an experiment concerning the above-mentioned problem, the following points were clarified.

FIG. 1 is a partial perspective view of a substrate 11 used in the present invention. The substrate 11 comprises glass, plastic, etc. On the substrate 11 are formed transparent electrodes 12 formed of, e.g., ITO (indium-tin-oxide), low-resistivity connecting lines or lead wires 13 formed of a metal, such as aluminum, chromium or molybdenum, or an alloy of these metals, each providing a stepwise elevation 14 extended in one direction and forming an edge line 15. The transparent electrodes 12 may be formed in a thickness of 300–5000 Å, preferably 500–2000 Å, and the low-resistivity lead wires 13 may be formed in a thickness of 300–5000 Å, preferably 500–3000 Å.

In the present invention, the substrate 11 may further be coated with an insulating film (not shown) for preventing a short circuit between the upper and lower electrodes and thereon with an alignment film (not shown). The insulating film may comprise, e.g., an $SiO_2$ film or $TiO_2$ film. Further, the alignment film may be a film of, e.g., polyvinyl alcohol, polyimide, polyamide, polyester, polyamideimide or polyesterimide.

Figure 4A:
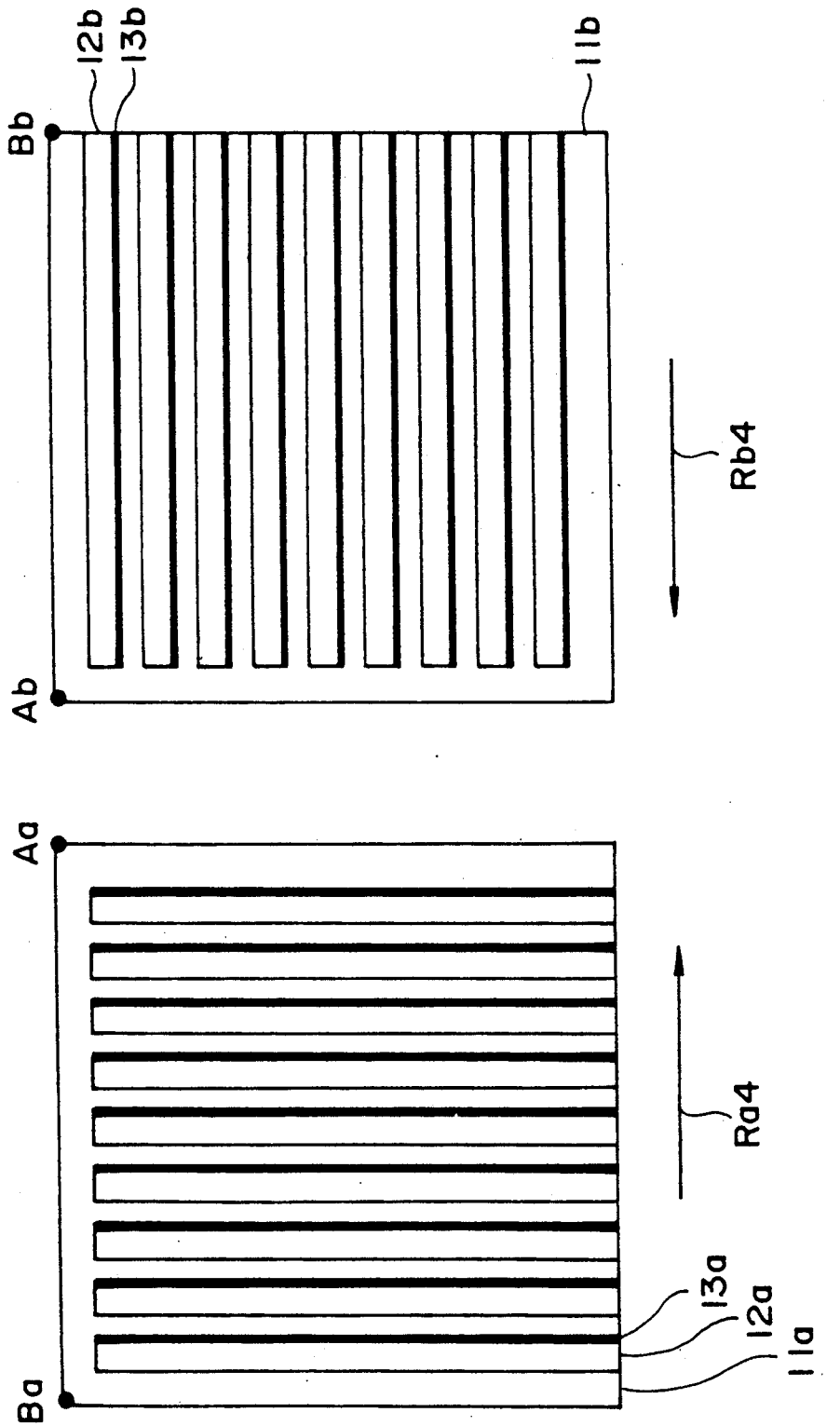
FIG. 4A is a schematic plan view of a pair of substrates outside the present invention.

FIG. 4A illustrates a pair of substrates 11a and 11b, each similar to one shown in FIG. 1 for constituting a liquid crystal device. In the liquid crystal device, the two substrates 11a and 11b are disposed opposite to each other so that a point Aa and a point Ab, and also a point Ba and Bb, are aligned with each other. The two substrates are provided with uniaxial orientation axes, such as those given by rubbing, in the directions of arrows Ra4 and Rb4, respectively. By disposing the substrates 11a and 11b in the above-described manner, the low-resistivity lead wire 13a and transparent electrode 12a are disposed to intersect the low-resistivity lead wire 13b and transparent electrode 12b, respectively, whereby a pixel $P_4$, for example, is formed as shown in FIG. 4B.

Figure 4B:
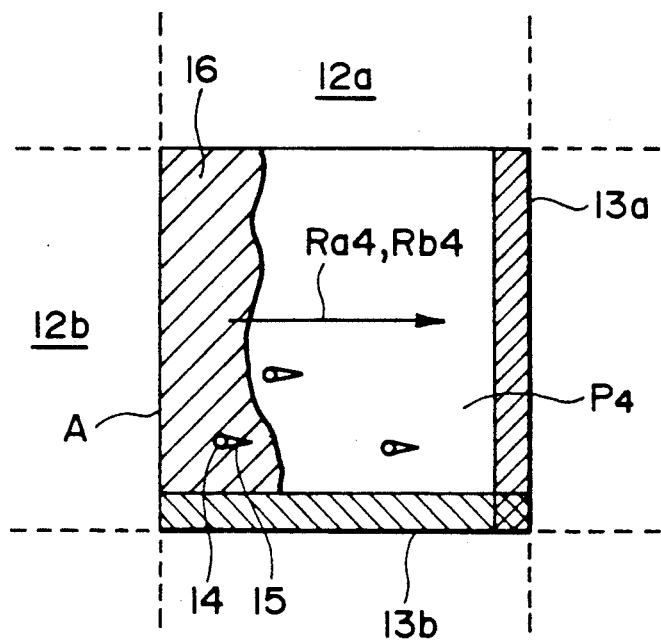
FIG. 4B is a plan view of a pixel formed thereby.

In the pixel $P_4$ shown in FIG. 4B, the uniaxial orientation R4 is disposed perpendicular to the low-resistivity lead wire 13a providing a linear projection or elevation in the pixel $P_4$, and the direction thereof is toward the low-resistivity lead wire 13a.

In such a pixel $P_4$ shown in FIGS. 4A and 4B, a plurality of pairs of defects each comprising a hairpin defect 14 and a lightning defect 15, and the hairpin defect 14 and the lightning defect 15 in each pair occur regularly in parallel with the uniaxial orientation axis Ra4 (and Rb4). Further, the lightning defect 15 of the pair of hairpin defect 14 and lightning defect 15 occurs closer than the hairpin defect 14 to the low-resistivity lead wire forming a linear projection.

The above-mentioned hairpin defect 14 and lightning defect 15 occur in a pair because of a bead spacer or fiber spacer disposed in a cell. Accordingly, the number of a the pairs of hairpin defect and a lightning defect occurring in a cell has a correlation with the number of bead spacers or fiber spacers dispersed in the cell. Further, such a pair of hairpin defect 14 and a lightning defect 15 is caused also by slight pressing of a cell by a finger.

FIGS. 7A-7C are sketches schematically showing modes of occurrence of such hairpin defect 71 and lightning defect 72. More specifically, FIG. 7A illustrates pairs of hairpin defect 71 and lightning defect 72 caused due to bead spacers. FIG. 7B illustrates a defect state given by pressing a cell having a pair of defects as shown in FIG. 7A so as to grow the defects, and FIG. 7C illustrates a state caused by further growing the defect state shown in FIG. 7B.

As shown in FIGS. 7A-7C, (1) the hairpin defect 71 and the lightning defect 72 occur in pair, and the optical states (e.g., transmittance) thereof are generally different from that of the surrounding domain (chiral smectic $C_2$ domain 74) and can be discriminated by a microscope; (2) the width $W_1$ of a hairpin defect 71 is larger than the width $W_2$ of a lightning defect 72, the width $W_1$ of a hairpin defect 71 having generally on the order of 2-10 microns, and the width $W_2$ of a hairpin defect being less than 2 microns; (3) a domain 73 surrounded by a hairpin defect 71 and a lightning defect 72 and a surrounding domain 74 form chiral smectic C phase with different alignment states, so that the respective domains may be defined as chiral smectic $C_1$ domain and chiral smectic $C_2$ domain, which show different optical states (e.g., transmittance) discriminatable by a microscope.

The above-mentioned hairpin defect and lightning defect are generally discussed in Preprint for Liquid Crystal Forum (October, 1987) p.p. 114–115, "Study on Structure of SSFLC State by Microscopic Spectral Analysis". Further, the above-mentioned chiral smectic $C_1$ phase and chiral smectic $C_2$ phase are discussed in U.S. Pat. application Ser. No. 245,644 (and corresponding European Patent Application No. 88115325.8).

According to our study, when a liquid crystal device having a matrix of pixels $P_4$ as shown in FIGS. 4A and 4D was subjected to a multiplexing scheme for writing at a frame frequency of 10 Hz as shown in FIG. 5 which shows time-serial waveforms of a scanning signal (A), data signals (B) and voltage signals (C) applied to a pixel $P_4$, a flickering was caused by a periodical change in luminance on a picture. According to our microscopic observation of the above-mentioned liquid crystal device under the multiplexing drive, an inverted portion 16 occurred in a region A on a side opposite to the low-resistivity lead wire 13a periodically and immediately after the application of a voltage $\uparrow \pm Va \uparrow$ exceeding the threshold voltage $\uparrow \pm Vth \uparrow$. It was found that the occurrence of such an inverted portion led to the above-mentioned flickering.

Figure 2A:
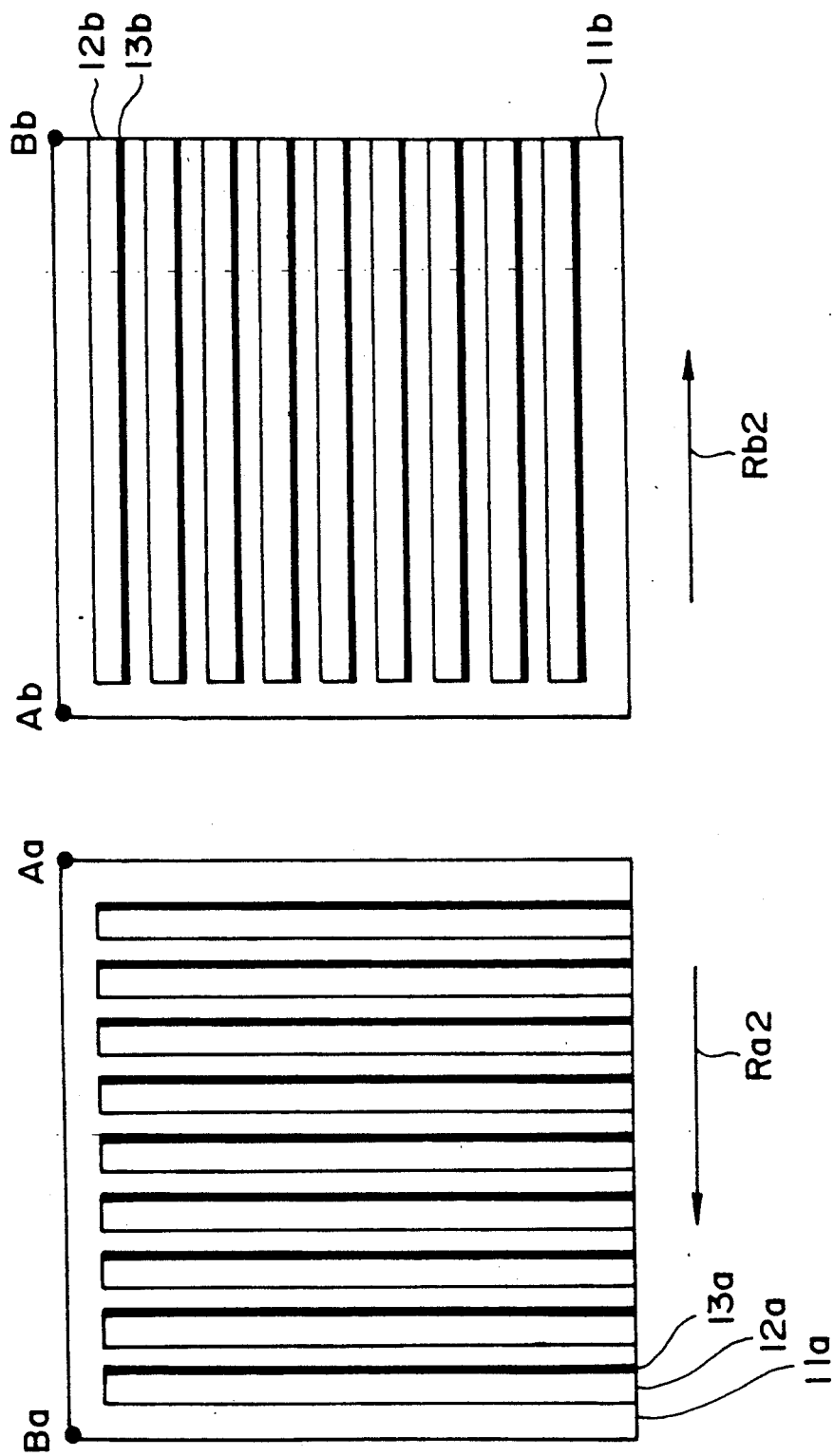
FIG. 2A is a schematic plan view of a pair of substrates used in the present invention.
Figure 2B:
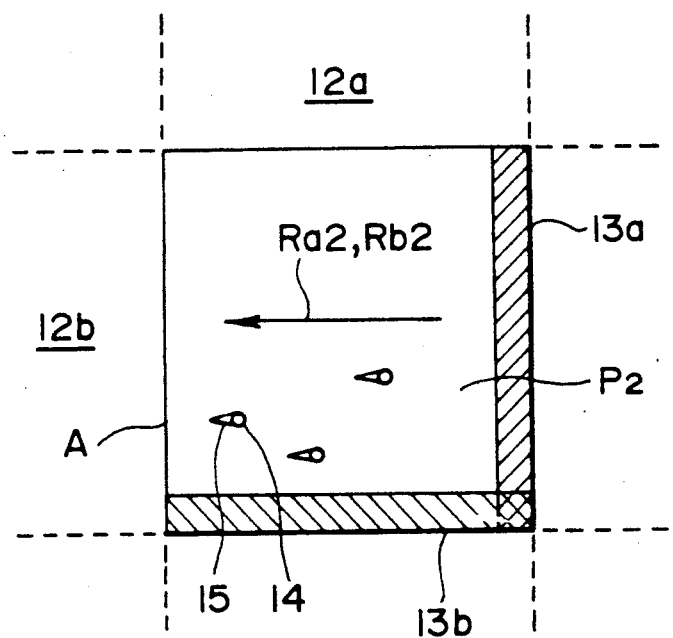
FIG. 2B is a plan view of a pixel formed thereby.

Then, we formed pixels $P_2$ as shown in FIGS. 2A and 2B in the same manner as pixels $P_4$ shown in FIGS. 4A and 4B except for changing the directions of the uniaxial orientation axes from Ra4 and Rb4 shown in FIGS. 4A and 4B to Ra2 and Rb2 which were reverse to Ra4 and Rb4, respectively, and directed toward the side A free of the low-resistivity lead wire 13a.

According to our observation, in a pixel $P_2$ as mentioned above, a pair of a hairpin defect 14 and a lightning defect 15 was formed in a direction opposite to that formed in the pixel $P_4$. Further, when a liquid crystal device having such pixels $P_2$ was subjected to the multiplexing drive scheme for writing shown in FIG. 5 similarly as described above, the occurrence of flickering due to a periodical change in picture luminance was not observed. When we observed such a pixel $P_2$ under the multiplexing drive, it was found that the inverted portion 16 which occurred in a pixel $P_4$ was not formed.

Figure 3A:
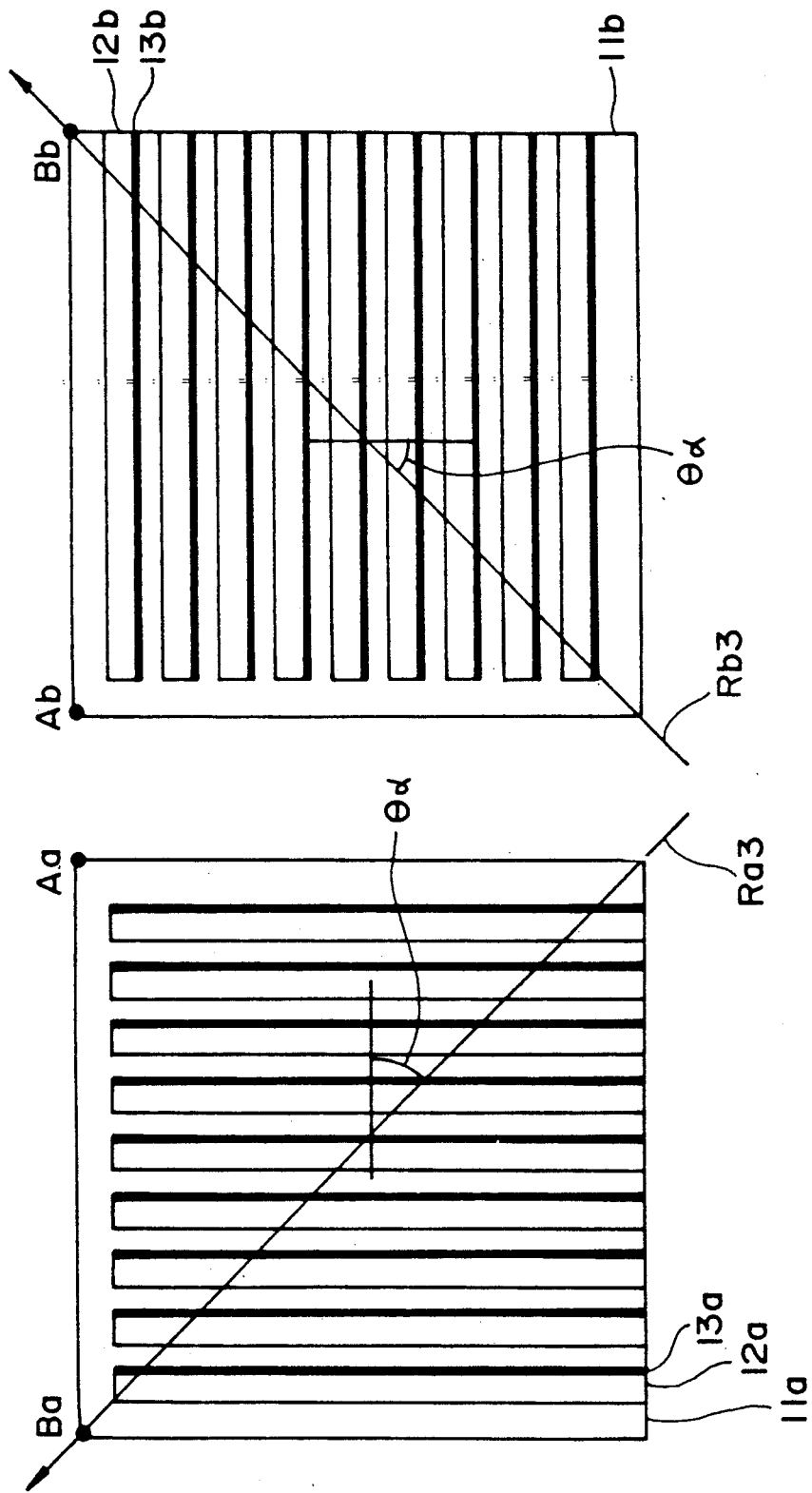
FIG. 3A is a schematic plan view of another pair of substrates used in the present invention.
Figure 3B:
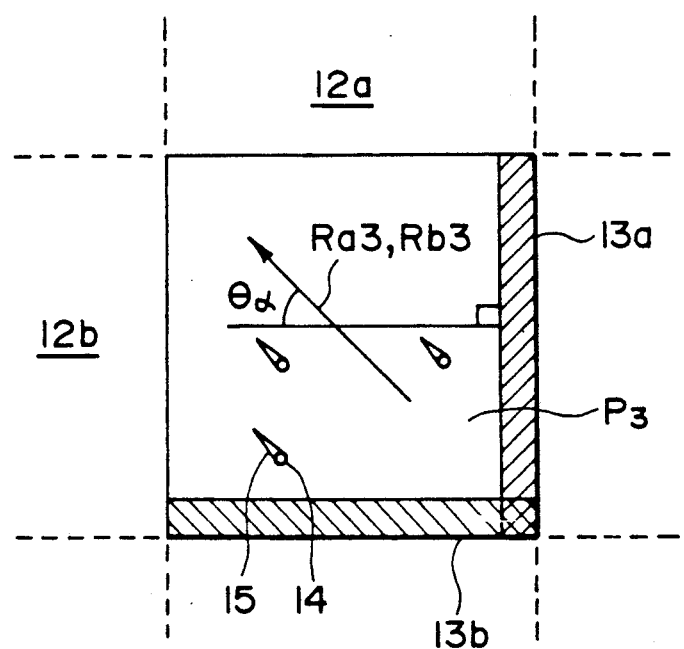
FIG. 3B is a plan view of a pixel formed thereby.

Further, a pixel $P_3$ as shown in FIGS. 3A and 3B was formed, wherein uniaxial orientation axes Ra3 and Rb3 were provided in directions respectively intersecting the low-resistivity lead wires 13a and 13b. In such a pixel $P_3$, a pair of a hairpin defect 14 and a lightning defect 15 was formed in such a manner that the hairpin defect 14 occurred closer to the low-resistivity lead wires 13a and 13b than the lightning defect 15, and the pair of the defects was aligned in parallel with the uniaxial orientation axes Ra3 and Rb3. When a liquid crystal device having such pixels $P_3$ was subjected to the multiplexing drive scheme in the same manner as above, no flickering and no inverted portion occurred.

Incidentally, FIGS. 2B, 3B and 4B are sketches of microscopic photographs at a magnification of 200.

The chiral smectic liquid crystal used in the present invention may be various ones, including those chiral smectic liquid crystals disclosed in, e.g., U.S. Pat. Nos. 4,651,726, 4,614,609, 4,589,996, 4,596,667, 4,613,209 and 4,615,586.

FIGS. 6A and 6B illustrate an embodiment of the liquid crystal device according to the present invention. FIG. 6A is a plan view of the embodiment and FIG. 6B is a sectional view taken along the line A—A in FIG. 6A.

A cell structure 600 shown in FIG. 6 comprises a pair of substrates 601 and 601a made of, e.g., glass plates or plastic plates which are held with a predetermined gap with spacers 604 and sealed with an adhesive 606 to form a cell structure. On the substrate 601 is further formed an electrode group (e.g., an electrode group for applying scanning voltages of a matrix electrode structure) comprising a plurality of transparent electrodes 602 in a predetermined pattern, e.g., of a stripe pattern. On the substrate 601a is formed another electrode group (e.g., an electrode group for applying signal voltages of the matrix electrode structure) comprising a plurality of transparent electrodes 602a intersecting with the transparent electrodes 602. The transparent electrodes 602 and 602a are respectively provided with low-resistivity lead wires 610 and 610a.

On the substrate 601a provided with such transparent electrodes 602a may be further formed an alignment control film 605 composed of an inorganic insulating material such as silicon monoxide, silicon dioxide, aluminum oxide, zirconia, magnesium fluoride, cerium oxide, cerium fluoride, silicon nitride, silicon carbide, and boron nitride, or an organic insulating material such as polyvinyl alcohol, polyimide, polyamide-imide, polyester-imide, polyparaxylylene, polyester, polycarbonate, polyvinyl acetal, polyvinyl chloride, polyamide, polystyrene, cellulose resin, melamine resin, urea resin and acrylic resin.

The alignment control film 605 may be formed by first forming a film of an inorganic insulating material or an organic insulating material as described above and then rubbing the surface thereof in one direction with velvet, cloth, paper, etc.

In another preferred embodiment according to the present invention, the alignment control film 605 may be formed as a film of an inorganic insulating material such as SiO or $SiO_2$ on the substrate 601a by the oblique or tilt vapor deposition.

In still another embodiment, the substrate 601a formed of glass or plastic plate per se or coated with a film of an inorganic insulating material or organic insulating material as described above may be subjected to oblique etching to provide an alignment control effect on the surface.

It is preferred that the alignment control film 605 also functions as an insulating film. For this purpose, the alignment control film may preferably have a thickness in the range of 100 Å to 1 micron, especially 500 to 5000 Å. The insulating film also has a function of preventing the occurrence of an electric current which is generally caused due to minor quantities of impurities contained in the liquid crystal layer 603, whereby deterioration of the liquid crystal compounds is prevented even on repeating operation.

It is possible to form an alignment control film similar to the one denoted by 605 also on the other substrate 606.

In the cell structure 600 shown in FIG. 6, the liquid crystal layer 603 may be formed in a chiral smectic phase comprising a plurality of layers each comprising a plurality of molecules. The chiral smectic liquid crystal 603 is disposed in a layer thin enough to suppress the formation of a helical structure which is inherently formed in its bulk state. The point is disclosed in detail in U.S. Pat. No. 4,367,924.

Such a cell structure 600 having substrates 601 and 601a is sandwiched between a pair of polarizers 607 and 608 to form an optical modulation device causing optical modulation when a voltage is applied between electrodes 602 and 602a.

According to the present invention, it is possible to provide a picture with a high display quality free of flickering caused by periodical change in luminance.

The present invention will be explained more specifically with reference to the following examples.

EXAMPLE 1

Two 1.1 mm-thick glass plates each provided with 800 Å-thick stripe electrodes were provided. Each stripe electrode 12 was further provided with a 1000 Å-thick molybdenum metal stripe as a low-resistivity lead wire 13 so as to stride the stripe electrode and the substrate surface as shown in FIG. 1. Each substrate was further coated with a 500 Å-thick $SiO_2$ layer for preventing a short circuit between the opposing electrodes.

Each substrate was further coated with a 0.1% IPA (isopropanol) solution of aminosilane by a spinner rotating at 2000 rpm for 15 seconds, followed by heating at 150° C., and further coated with a 2% solution of a polyimide forming liquid (SP-510 available from Toray K.K. in a mixture solvent (NMP: n-butylcellosolve =2:1)) by a spinner rotating at 3000 rpm for 30 seconds. After the film formation, the film was heat-cured at 300° C. for about 1 hour to form a 200 Å-thick polyimide alignment film.

Then, one glass plate (first substrate) was subjected to rubbing of the cured polyimide film in the direction of Rb2 in FIG. 2. The other glass plate (second substrate) was subjected to rubbing of the cured polyimide film in the direction of Ra2 in FIG. 2.

Thereafter, alumina beads having an average particle size of about 1.5 micron were dispersed on one substrate, on which the other substrate was superposed so as to form a parallel rubbing structure, followed by adhesion to form a cell.

The cell (gap) thickness was measured to be about 1.5 micron by a Berek compensator (measurement by phase difference). Into the cell, a chiral smectic liquid crystal "CS-1014" (available from Chisso K.K.) in isotropic phase was injected under vacuum and, after seating, aligned by cooling from isotropic phase at a rate of 0.5° C./hr. Experiments described hereinafter were further performed at 25° C.

The liquid crystal "CS-1014" showed the following phase transition series.

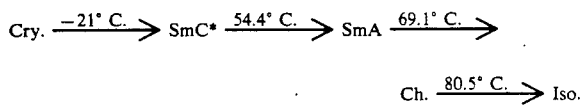

SmA: smectic A phase
Ch.: cholesteric phase
Iso.: isotropic phase

As a result of observation through right angle cross nicols, the liquid crystal in the cell showed a uniform monodomain free of defects of chiral smectic C phase in a non-helical structure.

Further, the liquid crystal cell was held at 60° C. to provide SmA alignment phase and observed through a polarizing microscope with right angle cross nicols to measure the direction of the smectic molecular layers by utilizing the fact that the liquid crystal molecules are aligned perpendicular to the molecular layers in the SmA phase. As a result, it was confirmed that the smectic molecular layers were aligned perpendicular to the rubbing direction.

The liquid crystal device was subjected to writing according to the driving scheme shown in FIGS. 5A, 5B, and 5C ($\Delta T=50$ μsec, $V_0=10$ volts), whereby no flickering was observed.

According to the driving scheme, a bright state and a dark state were written in one frame, and one-scanning period of $3\Delta T$ was used with respect to a writing pulse duration of $\Delta T$. Referring to FIG. 5A, there is shown a scanning signal applied to an n-th scanning line Sn; at FIG. 5B are shown data signals applied to a data line I for providing a sequence of W(white)→W→W→W→B (black)→W→W→W; and at FIG. 5C is shown a synthetic voltage waveform applied to a pixel formed at the intersection of the scanning line Sn and the data line I.

The alignment state in a pixel at this time was observed through a microscope at a magnification of 200, whereby a domain having a pair of a hairpin defect 14 and a lightning defect 15 due to an alumina bead was found to be formed, and the hairpin defect 14 was disposed closer to the molybdenum stripe 13a.

EXAMPLE 2

A cell was prepared in the same manner as in Example 1 except that the rubbing axes Ra3 and Rb3 and molybdenum stripes 13a and 13b were disposed to form an intersection angle θa of 45 degrees. The cell was then tested in the same manner as in Example 1, whereby a domain forming a pair of hairpin defect 14 and lightning defect 15 as shown in FIG. 3B was found to be formed as a result of observation through a microscope at a magnification of 200.

The cell was subjected to writing by a multiplexing drive in the same manner as in Example 1, whereby no flickering occurred.

In the present invention, the above intersection angle θa may be set in the range of generally 10-80 degrees, preferably 30-60 degrees.

COMPARATIVE EXAMPLE 1

A liquid crystal cell was prepared in the same manner as in Example 1 except that the rubbing axes Ra4 and Rb4 were directed as shown in FIG. 4A, whereby flickering was observed when subjected to the multiplexing drive.

In the driving, an inversion domain (inverted portion 16) opposite to a written domain occurred as shown in FIG. 4B from the side A free of the molybdenum stripe 13. More specifically, between white pixels, a white inversion domain occurred at the time of writing "black", and between black pixels, a black inversion domain occurred at the time of writing "white".

As a result of observation of the alignment state of a pixel, a domain accompanied by a pair of a hairpin defect 14 and a lightning defect 15 was found to be formed due to an alumina bead, whereby the lightning defect 15 was disposed closer to the molybdenum stripe 13a as shown in FIG. 4B.

EXAMPLES 3-8

Liquid crystal cells were prepared in the same manner as in Example 1 except that alignment film materials and liquid crystal materials shown in the following Table were used respectively, whereby similar results as shown in Example 1 were obtained.

TABLE

| Example | Alignment film | Liquid crystal material |
| --- | --- | --- |
| 3 | "SE 100", mfd. by Nissan Kagaku K.K. | "CS 1014" mfd. by Chisso K.K. |
| 4 | "SE 100", mfd. by Nissan Kagaku K.K. | "CS 1011" mfd. by Chisso K.K. |
| 5 | "SE 4110". mfd. by Nissan Kagaku K.K. | "CS 1014" mfd. by Chisso K.K. |
| 6 | "SE 4110". mfd. by Nissan Kagaku K.K. | "CS 1011" mfd. by Chisso K.K. |
| 7 | "LP 64" mfd. by Toray K.K. | "CS 1014" mfd. by Chisso K.K. |
| 8 | "LP 64" mfd. by Toray K.K. | "CS 2022" mfd. by Chisso K.K. |

"SE 100", "SE 4110" and "LP 64" in the above table are respectively a polyimide film-forming resin liquid.

What is claimed is:

1. A liquid crystal device, comprising:
   (a) a first substrate having a plurality of first elongated electrodes formed thereon, each first elongated electrode defining two longitudinal edges and having a first linear projection associated therewith along one of said longitudinal edges, said first substrate being provided with a uniaxial orientation axis in the direction from said first linear projection toward the other of said two longitudinal edges of said first elongated electrode associated therewith,
   (b) a second substrate having a plurality of second elongated electrodes disposed thereon opposite to and intersecting with said first elongated electrodes, said second substrate being provided with a uniaxial orientation axis in the same direction as the uniaxial orientation axis provided to said first substrate, and,
   (c) a chiral smectic liquid crystal disposed between said first and second substrates in a thickness small enough to suppress the formation of a helical structure inherent to said chiral smectic liquid crystal in its bulk state, said chiral smectic liquid crystal having an inclination of forming or actually forming a pair of a hairpin defect and a lightning defect, said hairpin defect being formed after said lightning defect in the direction of the uniaxial orientation axes.

2. A liquid crystal device according to claim 1, a linear projection is formed also along each second elongated electrode.

3. A liquid crystal device according to claim 1 or 2, wherein said linear projection comprises a low-resistivity substance.

4. A liquid crystal device according to claim 3, wherein said low-resistivity substance is a metal or a metal alloy.

5. A liquid crystal device according to claim 1, wherein a plurality of the first electrodes constitute scanning electrodes and a plurality of the second electrodes constitute data electrodes.

6. A liquid crystal device according to claim 1, wherein said uniaxial orientation axes are rubbing axes.

7. A liquid crystal device, comprising:
   (a) a first substrate having an elongated first electrode and a second substrate having an elongated second electrode; wherein a face of at least one of said first and second substrates has a linear projection forming a stepwise elevation extended in one direction, and wherein the faces of said first and second substrates have uniaxial orientation axes in the same direction as each other intersecting said linear projection at an intersection angle $\theta a$ in the range of 10-80 degrees, and (b) a chiral smectic liquid crystal disposed between said first and second substrates in a thickness small enough to suppress the formation of a helical structure inherent to said chiral smectic liquid crystal in its bulk state, said chiral smectic liquid crystal forming a plurality of adjacent molecular layers each comprising a plurality of molecules, said molecular layers having a normal thereto along the direction of the uniaxial orientation axes.

8. A liquid crystal device according to claim 7, wherein said intersection angle $\theta a$ is in the range of 30-60 degrees.

9. A liquid crystal device according to claim 7, wherein said elongated projection is disposed on the face of each of the first and second substrates.

10. A liquid crystal device according to claim 7, wherein said linear projection comprises a low-resistivity substance.

11. A liquid crystal device according to claim 10, wherein said low-resistivity substance is a metal or a metal alloy.

12. A liquid crystal device according to claim 7, further comprising a plurality of said first and second electrodes.

13. A liquid crystal device according to claim 12, wherein said plurality of said first electrodes comprise scanning electrodes and said plurality of the second electrodes comprise data electrodes.

14. A liquid crystal device according to claim 7, wherein said uniaxial orientation axes are rubbing axes.

* * * * *

UNITED STATES PATENT AND TRADEMARK OFFICE
CERTIFICATE OF CORRECTION

PATENT NO. : 5,007,716

DATED : April 16, 1991

INVENTOR(S) : YUKIO HANYU ET AL.

Page 1 of 2

It is certified that error appears in the above-identified patent and that said Letters Patent is hereby corrected as shown below:

COLUMN 1

Line 36, "driving drive." should read --driving.--.

COLUMN 3

Line 36, "a" (1st occurrence) should be deleted and "hairpin" should read --a hairpin--.

COLUMN 4

Line 21, "↑+Va ↑" should read --$|+V_a|$--.
Line 22, "↑±$V_{th}$↑." should read --$|\pm V_{th}|$.--.
Line 56, "and no" should read --or--.
Line 62 "4,651,726" should read --4,561,726--.

UNITED STATES PATENT AND TRADEMARK OFFICE
CERTIFICATE OF CORRECTION

PATENT NO. : 5,007,716
DATED : April 16, 1991
INVENTOR(S) : YUKIO HANYU ET AL.

It is certified that error appears in the above-identified patent and that said Letters Patent is hereby corrected as shown below:

COLUMN 8

```
Table, ""CS 2022" mfd. by Chisso K.K." should read
        --"CS 1011" mfd. by Chisso K.K.--.
Line 34, "and," should read --and--.
Line 46, "a" (2nd occurrence) should read --wherein a--.
```

Signed and Sealed this

Twenty-seventh Day of October, 1992

Attest:

DOUGLAS B. COMER

*Attesting Officer*          *Acting Commissioner of Patents and Trademarks*